March 23, 1926.

W. O. McKAMEY

HUB AND JOURNAL BOX

Filed July 27, 1923

Inventor
William O. McKamey
By Cyrus Kehr
Attorney

Patented Mar. 23, 1926.

1,577,480

UNITED STATES PATENT OFFICE.

WILLIAM O. McKAMEY, OF KNOXVILLE, TENNESSEE.

HUB AND JOURNAL BOX.

Application filed July 27, 1923. Serial No. 654,246.

*To all whom it may concern:*

Be it known that I, WILLIAM O. MC-KAMEY, a citizen of the United States, residing at Knoxville, in the county of Knox and State of Tennessee, have invented a new and useful Improvement in Hubs and Journal Boxes, of which the following is a specification, reference being had to the accompanying drawing.

This invention relates generally to hubs and axle boxes and particularly to the hubs and axle boxes of mine cars. In the form herein described, the axles are fixed and the wheel hubs have bearings in which are rollers surrounding the axles. The invention is also applicable to other bearings and axles or journals with which rollers are associated.

One of the objects of the invention is to provide convenient and efficient means for keeping the rollers in place when the bearing or axle box and the axle are separated.

Another object of the invention is to provide convenient and effective means for lubricating parts of the structure.

In the accompanying drawings,

Fig. 5 is a perspective showing a tubular liner which surrounds the group of rollers and bears against the inner face of the wheel hub.

Figure 1:
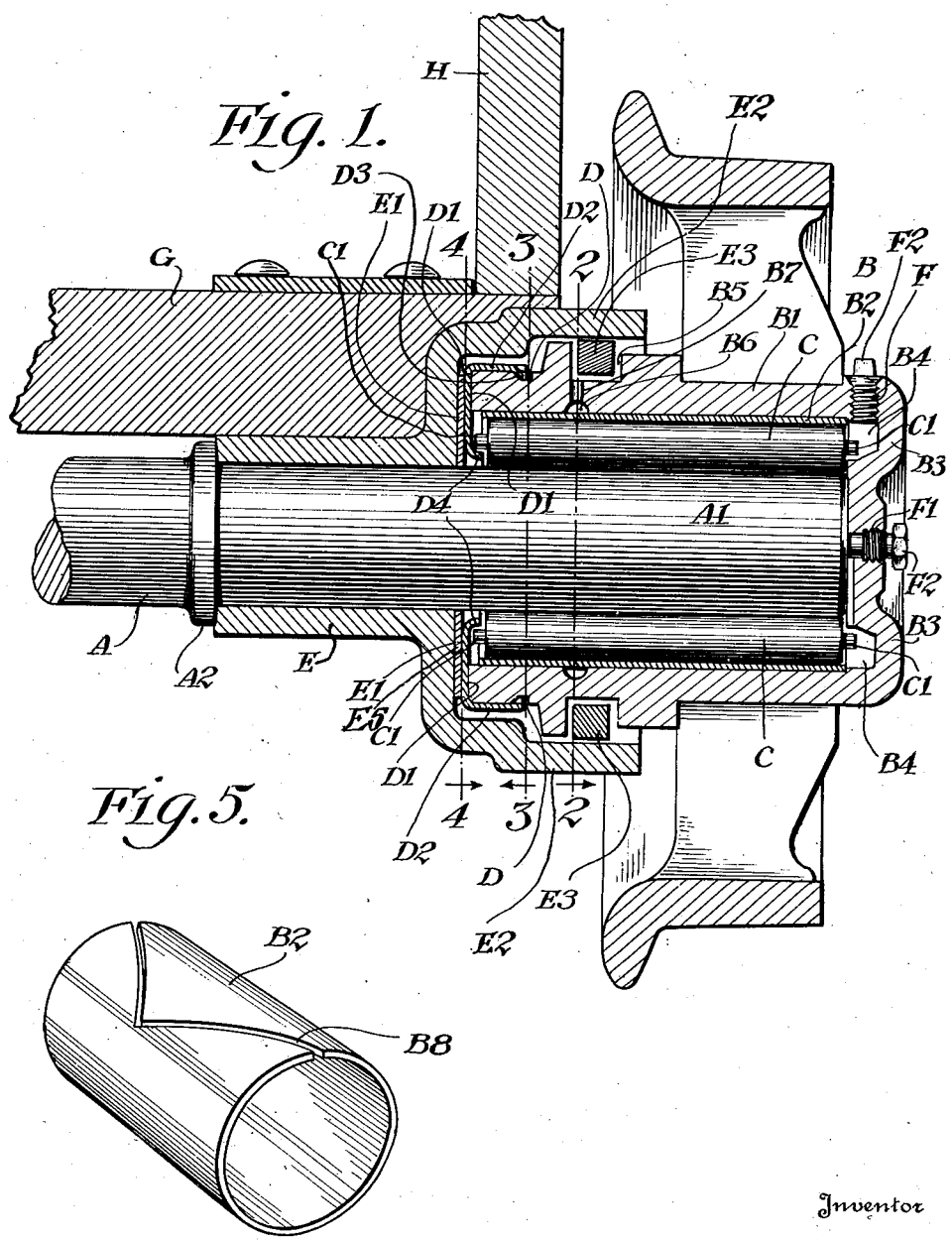
Fig. 1 is a longitudinal, upright section in a plane in which lies the axial line of the wheel.
Figure 2:
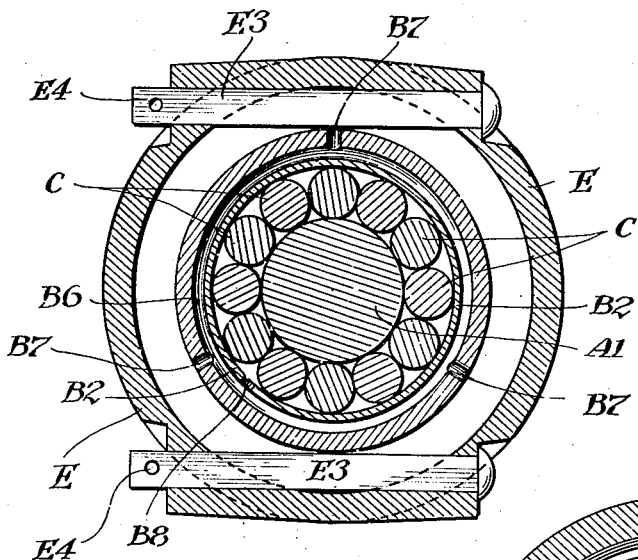
Fig. 2 is a transverse section on the line, 2—2, of Fig. 1, looking toward the right.
Figure 3:
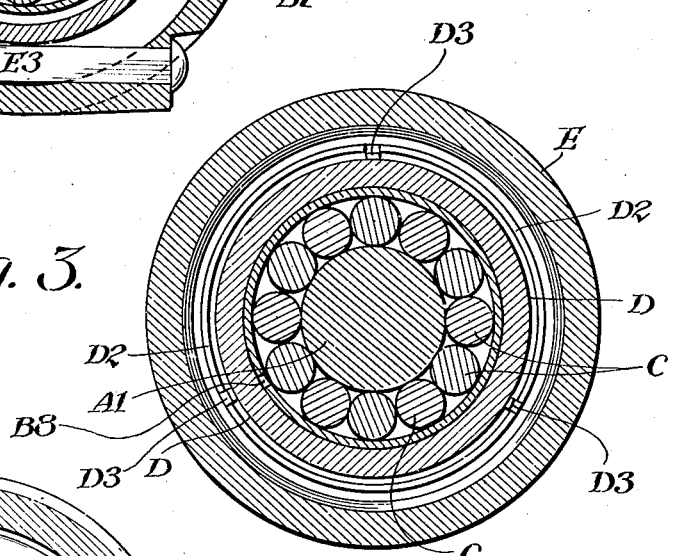
Fig. 3 is an upright section on the line, 3—3, of Fig. 1, looking toward the left.
Figure 4:
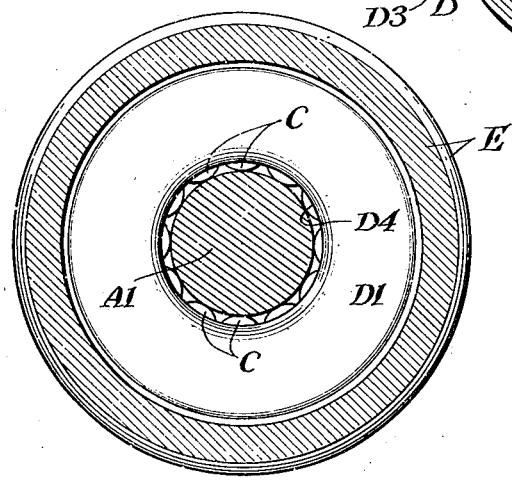
Fig. 4 is an upright section on the line, 4—4, of Fig. 1, looking toward the right, portions being broken away.

Referring to said drawings, A is the axle. $A^1$ is one of the journals on the axle. $A^2$ is a shoulder formed on the axle at the inner end of the journal. B is a wheel having a bearing or hub, $B^1$. Within the hub is a tubular liner, $B^2$, which bears against the inner face of the hub. In the liner is a diagonal slot, $B^8$. The hub has an end wall, $B^3$, which bears against the end of the journal, $A^1$. The journal and the inner face of the liner, $B^2$, are spaced from each other a distance equalling the diameter of each of the rollers, C. These rollers are placed parallel to the journal and fill the annular space between the journal and the liner. The end wall, $B^3$, of the hub has an annular channel, $B^4$, concentric to the journal axis and opposite the outer ends of the rollers, C. The bodies of said rollers extend only to or nearly to the plane of the end of the journal; but each roller has on its end a wrist, $C^1$, extending into the channel, $B^4$. Near the other end of the hub and on its outer face is a circumferential channel, D. An annular roller retaining member or ring, $D^1$, surrounds the journal and rests against the inner end of the hub and has an outer flange, $D^2$, extending across the outer face of the hub as far as and partially across the circumferential channel, D. At chosen places, parts, $D^3$, of said flange are bent or pressed into the channel, D. By this means the annular retaining member is firmly secured to the inner end of the hub. The edge of the member, $D^1$, which is adjacent the journal is bent toward the rollers, C, to form an annular flange or lip, $D^4$. Said flange extends between the journal and the wrists, $C^1$, formed on the adjacent ends of the rollers.

A bearing box, E, extends around the journal between the shoulder, $A^2$, and the washer, $E^1$, and bears against the journal. Said box is expanded to make a flange, $E^2$, extending outward around the hub, $B^1$, of the wheel. In the part of the hub which is surrounded by the flange, $E^2$, the hub has an external circumferential channel, $B^5$. Above and below the hub, a key, $E^3$, extends horizontally through the flange, $E^2$, and tangentially through the hub channel, $B^5$, and is retained by a cotter, $E^4$. Said keys prevent the wheel and hub from moving horizontally outward away from the bearing box, E. On the inner face of the hub opposite the channel, $B^5$, the hub is provided with an annular internal groove, $B^6$. Three radial ducts, $B^7$, connect the groove, $B^6$, with the channel, $B^5$.

Between the member, $D^1$, and the face, $E^1$, on the box E, a flat ring or washer, $E^5$, extends around the journal and rests flatwise against the member, $D^1$.

It is recommended that the parts be so proportioned as to cause contact between the washer, $E^1$, and the adjacent face of the bearing box and the adjacent face of the ring, $D^1$, when the end wall, $B^3$, of the hub bears against the end of the journal. When thus arranged, the inward end thrust will be divided between the end of the journal and the bearing box.

Any suitable lubricant may be introduced into the interior of the hub through ports, F or F¹, formed in the wall of the hub adjacent the outer end of the journal and normally closed by means of plugs F². The oil or grease thus introduced into the hub will pass between the rollers and along the face of the journal as far as the washer, E¹. This lubricant will also pass through the slot, B⁸, in the liner, B², into the oil groove, B⁶, and thence through the radial ducts, B⁷, into the external key channel, B⁵, whereby said channel and said keys are lubricated, whereby friction and heating between the keys, E³, and the faces of the key channel are reduced.

When the wheel is to be removed from the journal, the keys, E³, are removed. Then the wheel may be moved endwise outward away from the bearing box until the wheel is free from the journal. During such movement of the wheel, the ring, D¹, remains on the inner end of the hub. When the wheel is entirely free from the journal, the wrists, C¹, at the forward ends of the rollers remain in the channel, B⁴, and the wrists, C¹, on the rear ends of the rollers are confined by the annular lip, D⁴, formed on the ring, D¹. Thus the rollers remain in their places in the hub, although the wheel has been entirely removed from the journal.

It will be observed that the construction of the several parts of this mechanism is easily accomplished. The forming of the channel, B⁴, and the wrists, C¹, and the ring, D¹, with its flange, D², and lip, D⁴, are easy operations. So also are the forming of the hub channel, D, and the key channel, B⁵, and the groove, B⁶, and the radial ducts, B⁷. The bending of the flange, D², into the hub, D, is also a simple operation.

The bottom, G, and the side wall, H, of the car body are supported on the bearing box, E.

As used in the following claims, "bearing" designates both a hub an an axle box.

I claim as my invention,

1. The combination of an axle, rollers surrounding the axle and having end extensions, a bearing surrounding the rollers and having an external circumferential channel, and a ring surrounding the axle and extending across the end of the bearing adjacent said channel and engaging in said channel and having a lip directed toward the rollers and extending betwen the axle and the end extensions on the rollers, substantially as described.

2. The combination of an axle, rollers surrounding the axle and having end extensions, a bearing surrounding the rollers and having an external circumferential key channel and an internal lubricant channel and ducts connecting said channels, a ring surrounding the axle and extending across and around the end of the bearing adjacent said channels and secured to the bearing and having a lip directed toward the rollers and extending between the axle and the end extensions on the rollers, a bearing box surrounding the bearing, and a key engaging said bearing box and extending into said key channel, substantially as described.

3. The combination of an axle, rollers surrounding the axle and having end extensions, a liner surrounding the rollers, a bearing surrounding the liner, and a ring surrounding the axle and extending across and around one end of the bearing and secured to the bearing and having a lip directed toward the rollers and extending between the axle and the end extensions on the rollers, substantially as described.

In testimony whereof I have signed my name, this 23d day of July, in the year one thousand nine hundred and twenty-three.

WILLIAM O. McKAMEY.